United States Patent [19]

Naotake et al.

[11] Patent Number: 4,731,514
[45] Date of Patent: Mar. 15, 1988

[54] METHOD FOR PREDICTING BREAKING OF WIRE ELECTRODE IN WIRE ELECTRODE TYPE ELECTRIC DISCHARGE MACHINING OPERATION

[75] Inventors: Mohri Naotake, No. 3837-3, Shimadakuroishi, Tenpaku-cho, Tenpaku-ku, Nagoya-shi, Aichi; Nagao Saito, Tokyo, both of Japan

[73] Assignees: Naotake Mohri, Aichi; Mitsubishi Denki Kabushiki Kaisha, Tokyo, both of Japan

[21] Appl. No.: 845,152

[22] Filed: Mar. 27, 1986

[30] Foreign Application Priority Data

Sep. 27, 1985 [JP] Japan .................. 60-214001

[51] Int. Cl.$^4$ ............................. B23H 1/02
[52] U.S. Cl. ................. 219/69 W; 219/69 S
[58] Field of Search ............. 219/69 S, 69 V, 69 C, 219/69 G

[56] References Cited

U.S. PATENT DOCUMENTS 4,236,057 11/1980 Inoue ................. 219/69 C
4,582,974 4/1986 Itoh ..................... 219/69 S

FOREIGN PATENT DOCUMENTS 125934   9/1980 Japan ................. 219/69 C
57-71725 5/1982 Japan ................. 219/69 S
59-30620 2/1984 Japan ................. 219/69 S
573308   9/1977 U.S.S.R. ............. 219/69 S Primary Examiner—A. D. Pellinen
Assistant Examiner—Geoffrey S. Evans
Attorney, Agent, or Firm—Sughrue, Mion, Zinn, Macpeak and Seas

[57] ABSTRACT

In a wire electrode discharge machining method the breaking of the wire electrode is positively detected by detecting a discharge signal between the wire electrode and the workpiece over a predetermined unit period of time, and then monitoring the average value of high frequency components included in the spectrum of the discharge signal which are independent of the vibration of the wire electrode. When the average value of the high frequency components is found to exceed a predetermined level, countermeasures are taken to avoid the breaking of the wire electrode.

4 Claims, 9 Drawing Figures

METHOD FOR PREDICTING BREAKING OF WIRE ELECTRODE IN WIRE ELECTRODE TYPE ELECTRIC DISCHARGE MACHINING OPERATION

BACKGROUND OF THE INVENTION

The present invention relates to a method of preventing the breaking of a wire electrode such as may occur during the automatic operation of a wire electrode type electric discharge machining device. More particularly, the invention relates to a method of predicting the breaking of the wire electrode in a wire electrode type electric discharge machining operation by detecting preliminary symptoms of the breaking of the wire electrode.

An electrode type electric discharge machining device of the type to which the invention pertains is disclosed, for instance, by Japanese Published Patent Application No. 10856/1985. The general arrangement of the wire electrode feeding mechanism of this machining device is shown in FIG. 1.

In FIG. 1, reference numeral 1 designates a wire electrode about 0.2 mm in diameter made, for instance, of brass; 2, a wire supplying reel for supplying new wire electrode as the wire electrode 1 is consumed; 3, a wire electrode drive motor for pulling the wire electrode 1 upwardly at a certain speed; 4, a pinch roller used together with the roller of the drive motor 3 to guide the wire electrode; 5, a brake for stretching the wire electrode tight in the machining region A; and 6, a pinch roller used together with the roller of the brake 5 to hold the wire electrode 1 therebetween to transmit the braking force to the wire electrode.

Furthermore in FIG. 1, reference numeral 7 designates a wire electrode winding motor for winding wire electrode already used for machining and pulled upwardly by the drive motor 3; 8, a wire electrode winding reel; 10, a brake for stretching the wire electrode 1 tight in the region B; 11, a workpiece to be machined; 12, an electric current supplying contact member; and 13, a power supply unit for supplying a voltage across the workpiece 11 and the wire electrode 1. In the conventional device, the brake 5 and the pinch roller 6 are used to stretch the wire electrode tight in the machining area A.

A serious abnormal condition of the wire electrode type electric discharge machining device thus arranged is the breaking of the wire electrode, which usually occurs unexpectedly. When breaking of the wire electrode occurs, the machining operation must be suspended. In this case, an automatic wire electrode supplying device is operated to feed the wire electrode 1 through the upper and lower dies (not shown) so that the machining operation can be started again.

It is impossible to pass the wire electrode through the dies again at the position relative to the workpiece where the breakage of the wire electrode occurred; that is, it must be done at the initial hole (approach hole) on the workpiece, namely, the machining origin point. Thereafter, the wire electrode is moved along the original profile to the position where the breakage occurred.

When the wire electrode breaks, vertical stripes are formed in the surface of the workpiece at the position where the wire electrode broke. Therefore, it is essential to employ countermeasures to prevent breakage of the wire electrode as described above. To do this, it is essential to detect phenomena preliminary to the breaking of the wire electrode, thereby to prevent the breaking of the wire electrode. For this purpose, recently a method of statistically processing signals representative of the machining current or voltage or of machining sounds picked up through a microphone to detect abnormal conditions has been studied.

Conventionally, it has been the practice to detect phenomena preliminary to the breaking of the wire electrode merely by processing such signals without taking the actual wire electrode breaking mechanism into consideration. Therefore, the method is effective only in some cases. Further, the conventional method is effective to detect the phenomena preliminary to breaking only several seconds to several tens of seconds before the actual breaking of the wire electrode occurs because it takes time to process the signals. Accordingly, the method is not effective at all in cases where the breaking of the wire electrode occurs abruptly.

SUMMARY OF THE INVENTION

An object of the invention is thus to eliminate the above-described difficulties accompanying a conventional method of predicting the braking of a wire electrode. More specifically, an object of the invention is to provide a method which takes into account the actual breaking mechanism so as to be able to detect symptoms preliminary to the breaking of the wire electrode in all cases and thereby allow measures to be taken to prevent the breaking of the wire electrode and to automatically obtain information about the probability of the breaking of the wire electrode during unstable machining operations.

A method of predicting the breaking of a wire electrode according to the invention is applied to a wire electrode type electric discharge machining operation in which an electrically conductive wire is employed as an electrode and an electric discharge between the wire electrode and the workpiece is utilized to machine the latter. In the method, a discharge signal between the wire electrode and the workpiece is detected for a unit period of time during machining, and the average value of high frequency components which are included in the spectrum of the discharge signal thus detected and which are independent of the vibration of the wire electrode are monitored in level to detect symptoms preliminary to the breaking of the wire electrode.

As described above, in the method according to the invention, the discharge signal between the wire electrode and the workpiece is detected for a unit period of time, and the time average of the high frequency components which are included in the spectrum of the discharge signal thus detected and which are independent of the vibration of the wire electrode are detected in level to predict the breaking of the wire electrode, which is indicated by a prediction signal. In response to the prediction signal, the power supply is disconnected temporarily, or the tension of the wire electrode is decreased, or the workpiece is retracted, or these operations are selectively carried out in combination to avoid the breaking of the wire electrode. Also, instruction signals as to the results of these operations are outputted.

DESCRIPTION OF THE PREFERRED EMBODIMENTS

A preferred embodiment of the invention will be described with reference to the accompanying drawings. First, the basic principles of the method of the invention will be described.

Figure 2:
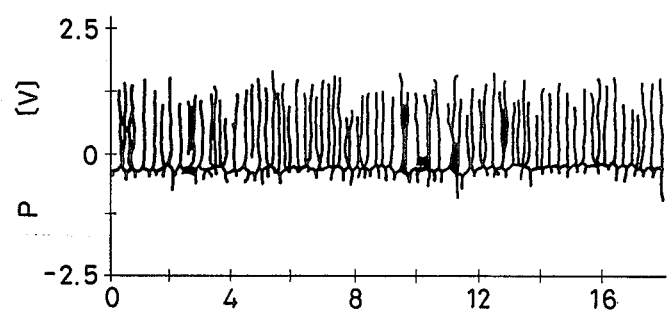
FIG. 2 is a waveform diagram showing an interelectrode voltage waveform during a normal machining operation.
Figure 3:
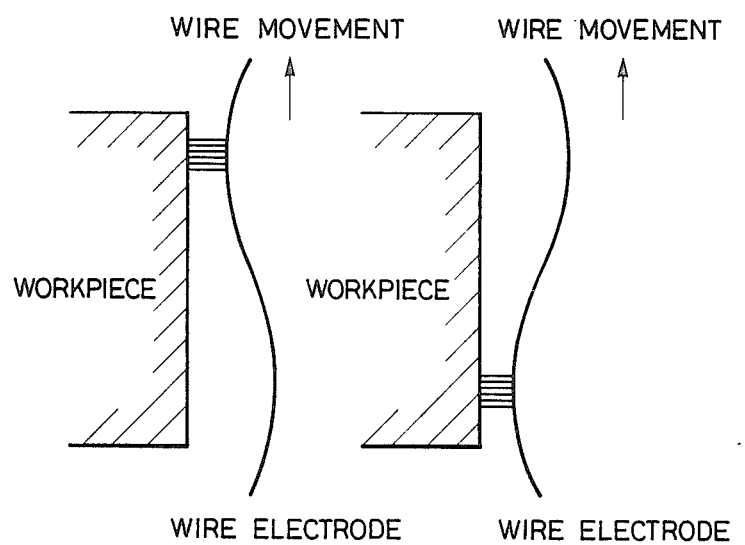
FIG. 3 is an explanatory diagram showing a discharge condition during the normal machining operation.

Under ordinary machining conditions, the reaction force of the electric discharge causes the wire electrode to vibrate between the upper and lower dies at a frequency f. The frequency f is defined as follows:

$$f = n/2l\sqrt{T/e}$$

where e is the linear density of the wire electrode, T is the tension in the wire electrode, l is the gap between the dies, and n is a positive integer. Because of this vibration, the electric discharge frequency increases as the wire electrode moves towards the workpiece, and the electric discharge is interrupted as the wire electrode is moved away from the workpiece. This means that, as shown in the interelectrode voltage waveform diagram of FIG. 2, in a normal machining operation the electric discharge frequency periodically increases and decreases, and deionization is carried out with the same period. Hence, as shown in FIG. 3, the electric discharge moves up and down the electrode; that is, the position of the electric discharge periodically changes. Accordingly, the wire electrode will not be broken by the electric discharge if held under a suitable tension.

Figure 4:
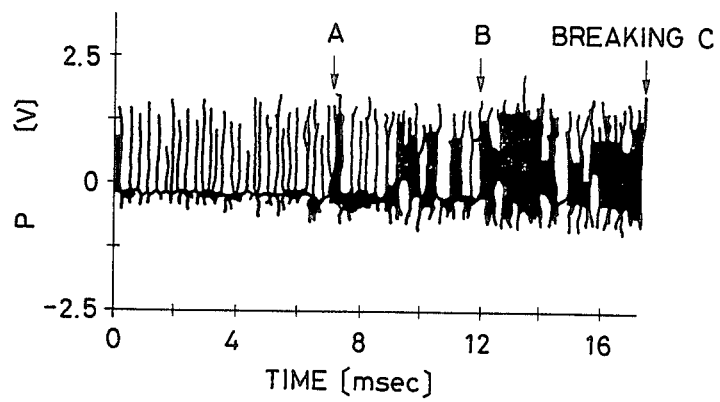
FIG. 4 is also a waveform diagram showing an interelectrode voltage waveform during an abnormal machining operation.
Figure 5:
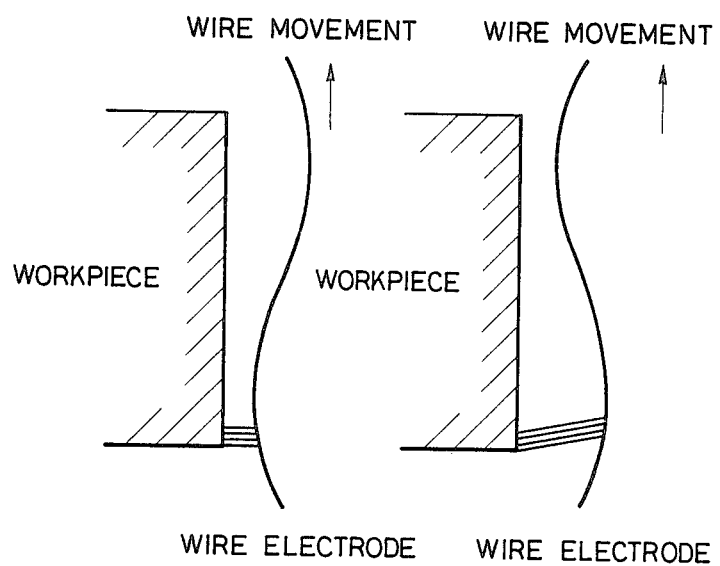
FIG. 5 is an explanatory diagram indicating a discharge condition during the abnormal machining operation.

On the other hand, immediately before the wire electrode breaks during machining, as shown in FIG. 4, the electric discharge frequency becomes greatly different from the vibration frequency of the wire electrode, and the larger part of the discharge energy is contained in the high frequency components. That is, the electric discharge occurs irrespective of the vibration of the wire electrode. Accordingly, even when the wire electrode moves away from the workpiece, the electric discharge is not suspended, that is, deionization does not occur. In this case, as shown in FIG. 5, the electric discharge occurs at only one position, which causes the wire electrode to break.

Figure 6:
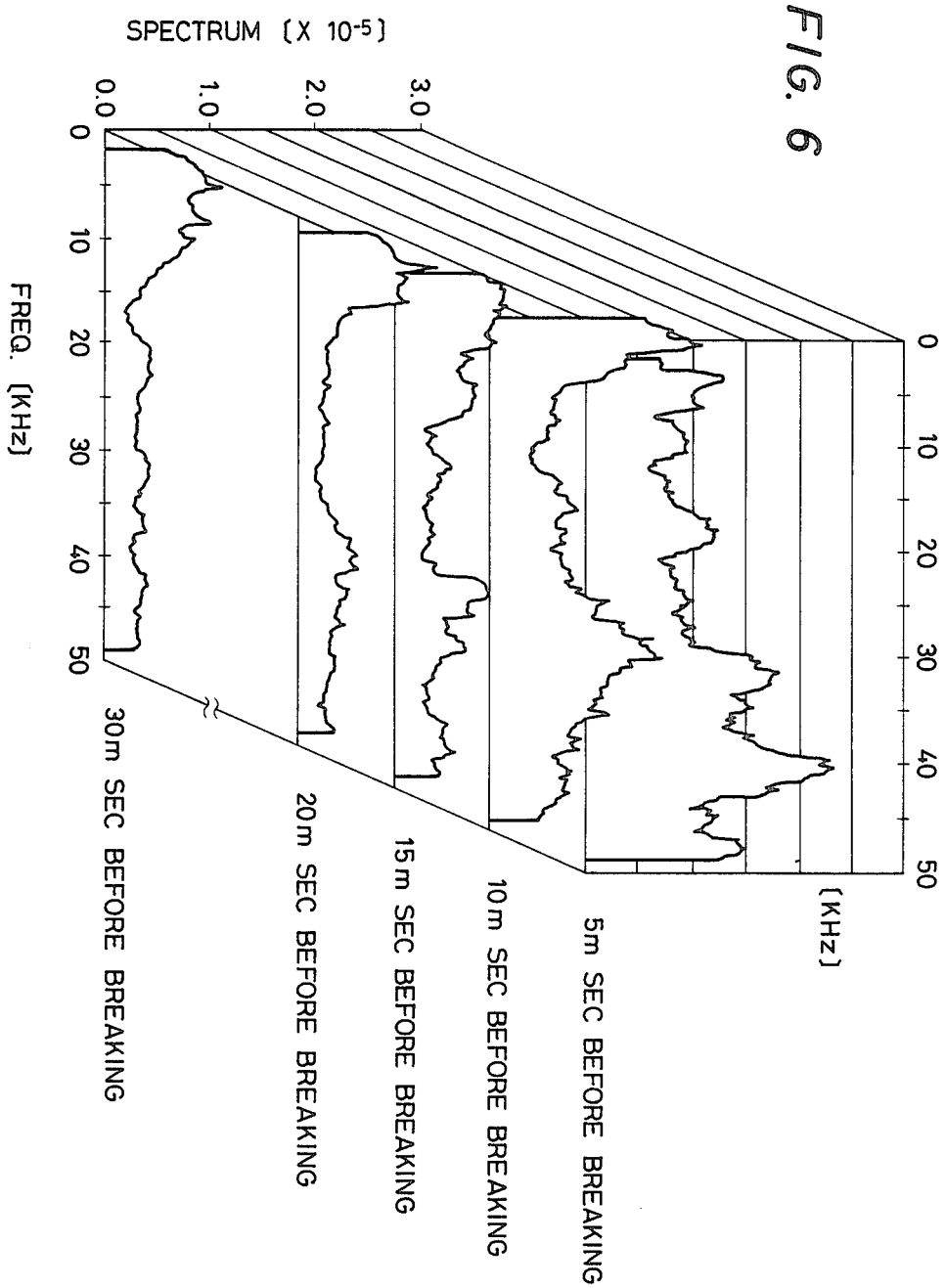
FIG. 6 is an explanatory diagram for analysis of electric discharge frequency spectra obtained at data intervals of 5 msec.

FIG. 6 shows the electric discharge frequency spectrum for a normal electric discharge 30 seconds before the breaking of the wire electrode, and electric discharge frequency spectra detected 20 msec, 15 msec, 10 msec, and 5 msec before the wire breaks. As is apparent from FIG. 6, the high frequency components, i.e. those above 20 KHz, increase significantly just before the time instant of breaking. That is, the concentration of the electric discharge in one position, which occurs immediately before the breaking of the wire electrode, can be detected from the high frequency components, which are not related to the vibration frequency of the wire electrode.

The principles of the method according to the invention have been described. A specific embodiment thereof will now be described.

During the operation of the wire electrode type electric discharge machining device, the wire electrode may break when the machining conditions set are unacceptable, for instance, the thickness of the workpiece under machining changes or external conditions change, such as in the machining of corners. In order to positively prevent the breaking of the wire electrode due to such causes, it is necessary not only to detect the abnormal electric discharge early, but also to detect abnormal conditions which occur abruptly to allow countermeasures to be taken, as described above.

Figure 1:
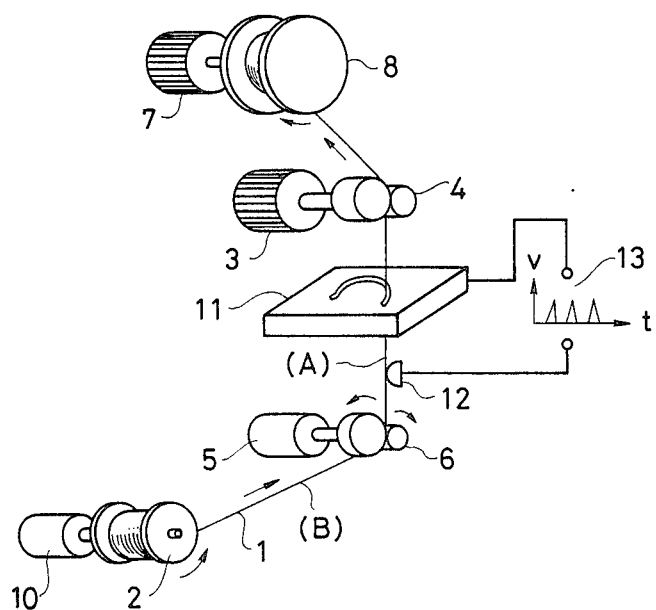
FIG. 1 is an explanatory diagram showing the arrangement of the wire electrode feeding mechanism in a wire electrode type electric discharge machining device.
Figure 7:
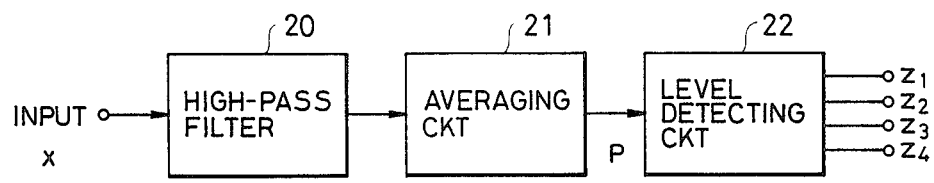
FIG. 7 is a block diagram showing an apparatus for practicing the method of the invention.

FIG. 7 is a block diagram of an apparatus for practicing the method of the invention. The apparatus is an analog processing device which can obtain the time averaged frequency spectrum at high speed in real time.

In FIG. 7, the input x is the instantaneous value of a signal such as one representing the discharge frequency or discharge power. The instantaneous value x is applied to a high-pass filter 20, the output of which is supplied to an averaging circuit 21. The output P of the averaging circuit 21 represents the average value of the high frequency components of the discharge signal. The outputs $z_1$, $z_2$, $z_3$ and $z_4$ of a level detecting unit 22 are provided using values $\sigma$, $2\sigma$, $3\sigma$ and $4\sigma$ as references (where $\sigma$ is the standard deviation of the output P of the circuit 21.) The standard deviation is obtained according to the following equation:

$$\sigma = \sqrt{\overline{P^2} - \overline{P}^2}$$

where $\overline{P}$ and $\overline{P^2}$ are the average values of the outputs P and $p^2$, respectively, which are provided for a sufficiently long period of time in the normal machining operation. Those values may be obtained in test machining operations or otherwise empirically.

The outputs $z_1$, $z_2$, $z_3$ and $z_4$ provided by the level detecting unit 22 indicate the degrees of abnormality or urgent conditions.

Figure 8:
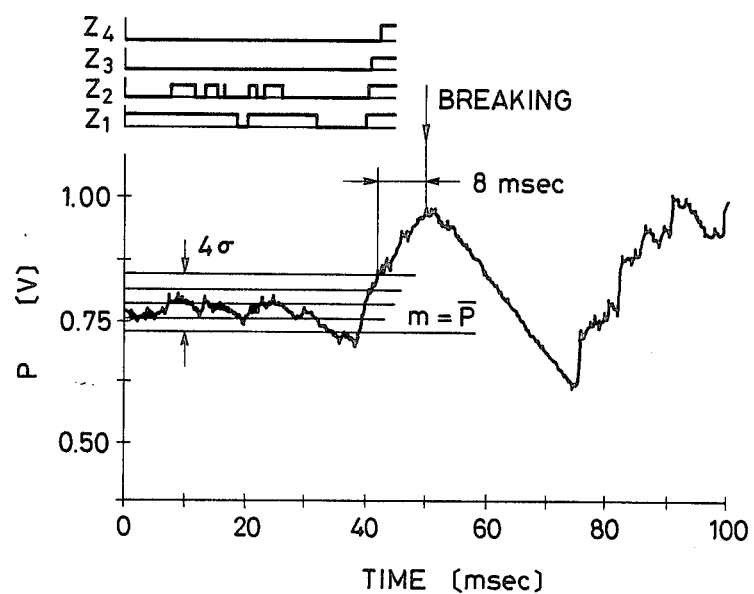
FIGS. 8 and 9 are graphical representations indicating examples of the variation of the average value of the high frequency components in an electric discharge frequency spectrum which takes place before the breaking of the wire electrode.

FIG. 8 shows vibrations of the average P of the high frequency components in the electric discharge frequency spectrum before the breaking of the wire electrode. In FIG. 8, abnormal conditions of the order of $2\sigma$ occur before breakage occurs, and the average P exceeds the level of $4\sigma$ about 8 msec before the wire electrode breaks. The abnormal conditions are thus indicated a relatively long period of time before breakage, and therefore the breaking of the wire electrode can be prevented by changing the discharge conditions, for instance, by increasing the discharge pause time.

Figure 9:
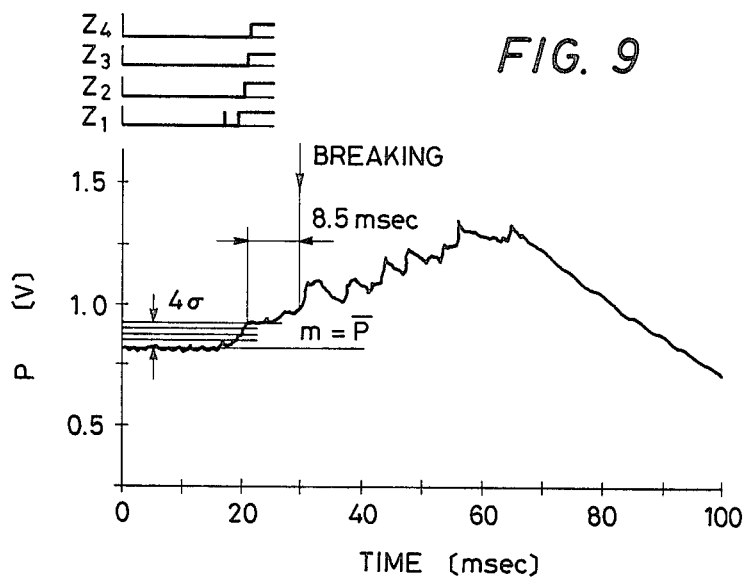

In the case of FIG. 9, the average P exceeds the level $4\sigma$ abruptly 8.5 msec before the sudden breaking of the wire electrode. Therefore, in this case, emergency measures should be taken in which, for instance, in response to the presence of the signal $z_4$, the supplying of current from the power source is suspended immediately, and after a predetermined period of time, namely, after the restoration of deionization, the supplying of current is started again.

As is apparent form the above description, in the inventive wire electrode type electric discharge machining method in which an electrically conductive wire is employed as an electrode and the electric discharge between the wire electrode and the workpiece is utilized to machine the latter, according to the invention, the discharge signal between the wire electrode and the workpiece is detected for a unit period of time during the machining operation, and the average value of the high frequency components in the electric discharge frequency spectrum thereof is monitored to detect the preliminary phenomena which occur before the breaking of the wire electrode. Therefore, in a wire electrode type electric discharge machining operation, the breaking of the wire electrode can be prevented, which contributes greatly to an increase of the machining efficiency. Furthermore, for the same reason, no stripes or the like are formed on the workpiece, and the machining accuracy is greatly improved.

We claim:

1. In a wire electrode type electric discharge machining operation in which an electrically conductive wire is employed as an electrode and advanced under tension through a workpiece to be machined, and electric discharge between said wire electrode and the workpiece is utilized to machine said workpiece, a method of predicting an imminent breaking of the wire electrode, comprising the steps of:

detecting an electric discharge signal between said wire electrode and said workpiece during machining; and monitoring an average value of high frequency components included in a spectrum of the detected electric discharge signal above 20 KHz which are independent from discharge induced vibration frequencies of said wire electrode, an increase in said average value of high frequency components beyond a predetermined level being indicative of a stationary electric discharge and attendantly the imminent breaking of said wire electrode;

wherein the steps of monitoring the high frequency components include:

applying said discharge signal to a high-pass filter, and applying an output of said high-pass filter to an averaging circuit.

2. The wire electrode breaking detecting method of claim 1, further comprising the step of comparing an output of said averaging circuit with a plurality of reference levels to provide a plurality of respective outputs indicative of corresponding different levels of abnormal conditions.

3. The wire electrode breaking detecting method of claim 2, wherein said reference levels are each a different integer multiple of a standard deviation of said output of said averaging circuit.

4. The wire electrode breaking detecting method of claim 3, further comprising the step of, in response to a predetermined one of said outputs indicative of corresponding different levels of abnormal conditions, effecting at least one of suspending supplying of current to said wire electrode from a power source, retracting said workpiece, and adjusting a tension in said wire electrode.

* * * * *